United States Patent
Chen et al.

(10) Patent No.: US 9,174,420 B2
(45) Date of Patent: Nov. 3, 2015

(54) BREATHABLE FILM WITH INTERNAL VIRAL AND ALCOHOL BARRIER LAYER

(75) Inventors: Yuhming Chen, Pittsford, NY (US); Alfred F. Baldwin, Jr., Franlinville, NC (US); Bradley P. Finnigan, Greensboro, NC (US)

(73) Assignee: Pliant, LLC, Evansville, IN (US)

( * ) Notice: Subject to any disclaimer, the term of this patent is extended or adjusted under 35 U.S.C. 154(b) by 286 days.

(21) Appl. No.: 12/540,205

(22) Filed: Aug. 12, 2009

(65) Prior Publication Data
US 2011/0039083 A1   Feb. 17, 2011

(51) Int. Cl.
| | |
|---|---|
| *B32B 27/08* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |

(52) U.S. Cl.
CPC ............. *B32B 27/08* (2013.01); *B32B 27/28* (2013.01); *B32B 27/30* (2013.01); *B32B 27/32* (2013.01); *B32B 27/34* (2013.01); *B32B 27/36* (2013.01); *Y10T 428/24998* (2015.04); *Y10T 428/249979* (2015.04)

(58) Field of Classification Search
CPC ........ B32B 27/08; B32B 27/28; B32B 27/30; B32B 27/34; B32B 27/36; B32B 27/32
USPC .......... 428/304.4, 315.9, 315.5, 315.7, 316.6, 428/317.1, 317.5, 317.9
See application file for complete search history.

(56) References Cited

U.S. PATENT DOCUMENTS

| | | |
|---|---|---|
| 4,539,256 A | 9/1985 | Shipman |
| 4,739,012 A | 4/1988 | Hagman |
| 4,868,062 A | 9/1989 | Hoeschele et al. |
| 5,164,258 A | 11/1992 | Shida et al. |
| 5,260,360 A | 11/1993 | Mrozinski et al. |
| 5,690,949 A | 11/1997 | Weimer et al. |
| 5,738,111 A | 4/1998 | Weimer et al. |
| 5,935,370 A | 8/1999 | Weimer et al. |
| 5,938,648 A | 8/1999 | LaVon et al. |
| 5,938,874 A | 8/1999 | Palomo et al. |
| 5,955,187 A | 9/1999 | McCormack et al. |
| 6,002,064 A | 12/1999 | Kobylivker et al. |
| 6,075,179 A | 6/2000 | McCormack et al. |
| 6,114,024 A | 9/2000 | Forte |
| 6,187,696 B1 | 2/2001 | Lim et al. |

(Continued)

FOREIGN PATENT DOCUMENTS

EP    1 034 075 B1    11/1999

OTHER PUBLICATIONS

PCT International Search Report for PCT/US2010/043497 completed by the US Searching Authority on Oct. 4, 2010.

(Continued)

*Primary Examiner* — Victor Chang
(74) *Attorney, Agent, or Firm* — Barnes & Thornburg LLP

(57) ABSTRACT

Multilayer breathable barrier films are provided. The films contain one or more layers of polymers without fillers in combination with at least two or more microporous breathable layers. The barrier layer provides a viral and alcohol barrier that can effectively allow moisture vapor to pass.

17 Claims, 4 Drawing Sheets
(4 of 4 Drawing Sheet(s) Filed in Color)

(56) References Cited

U.S. PATENT DOCUMENTS

| | | | |
|---|---|---|---|
| 6,682,803 B2 | 1/2004 | McCormack et al. |
| 6,929,853 B2 | 8/2005 | Foote |
| 7,226,880 B2 | 6/2007 | Potnis |
| 2003/0162010 A1 | 8/2003 | Forte |
| 2003/0207138 A1 | 11/2003 | Kong et al. |
| 2004/0219337 A1 | 11/2004 | Langley et al. |
| 2006/0216496 A2 | 9/2006 | Gray et al. |
| 2007/0128427 A1 | 6/2007 | Suzuki et al. |
| 2008/0131676 A1 | 6/2008 | Becke et al. |

OTHER PUBLICATIONS

Chen, "Development of New Ionomers with Novel Gas Permeation Properties", Journal of Plastic Film and Sheeting, vol. 23, No. 2, 119-132 (2007).

Hytrel® HTR 8206 Preliminary Data (2 pages) Mar. 14, 1994.

Arnitel® VT 3104 Property Data Sheet (2 pages) May 7, 2009.

Arnitel® 3104-TPC-ET Application Solutions Sheet (1 page) May 26, 2008.

DuPont® Hytrel® Extrusion Guide (23 pages) Mar. 1994.

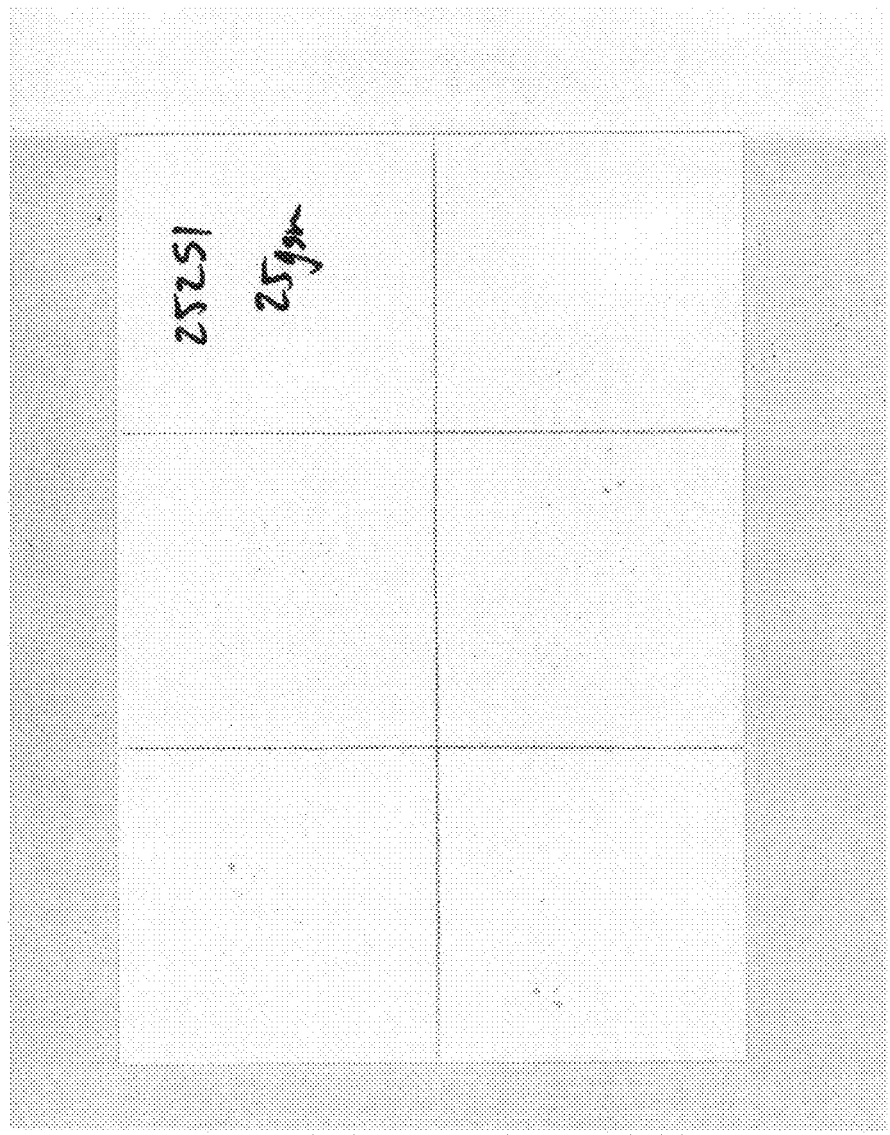

BREATHABLE FILM WITH INTERNAL VIRAL AND ALCOHOL BARRIER LAYER

RELATED APPLICATIONS

[Not Applicable]

FEDERALLY SPONSORED RESEARCH OR DEVELOPMENT

[Not Applicable]

FIELD OF THE INVENTION

The presently described technology generally relates to a multilayer breathable viral barrier film and items such as laminates and garments made therefrom.

BACKGROUND OF THE INVENTION

Microporous films produced by various means have been used for breathable applications. There are a variety of thermoplastic films available on the market that exhibit breathability and liquid barrier properties. One such group of films is monolithic hydrophilic polymeric films. These films are able to transmit moisture without the additional need of fillers and stretching. The mechanism of breathability is accomplished by absorbing and desorbing moisture. One short fall of these class of films is that monolithic hygroscopic film are unsuitable for lamination to a fabric by thermo-bonding. Another shortfall is that this class of films tends to be expensive to produce and cannot be utilized for extensive end uses where cost containment is necessary. Further, to incorporate opacity characteristics into these films, high levels of pigment are needed, which further increases production costs. Primarily due to such cost concerns, laminates and garments produced from these films are not suitable for disposable applications.

Monolithic and microporous multilayer films are also known. While these films have both viral barrier capabilities as well as breathability, their manufacture is expensive and their use is not suited for disposable applications. Concurrent use of hydrophilic monolithic outer layers and a microporous core layer is described in U.S. Pat. Nos. 6,114,024 and 6,929,853 to Nicholas F. Forte (Kimberly-Clark Worldwide, Inc., Neenah, Wis.). The Forte patents, in general, describe outer layers of hydrophilic polymeric thermoplastics bonded to a core layer with microporous adhesive layers. These films cannot be used for thermo-bonding lamination, and they have monolithic layer on the skins without proper protection, which would increase the risk of pin holes. This is an expensive structure to produce as it contains the monolithic materials. U.S. Pat. No. 6,187,696 to Lim et al. (E. I. du Pont de Nemours and Company—Wilmington, Del.) discusses a moisture vapor permeable, substantially liquid impermeable composite sheet material comprising a fibrous substrate and a moisture vapor permeable thermoplastic film layer. The moisture vapor permeable film is preferably comprised of at least about 50% by weight of polymer selected from the group of block copolyether esters, block copolyether amides, polyurethanes, polyvinyl alcohol, and combinations thereof. Another version of this concept is a microporous film laminated with a monolithic film as a barrier, as described in U.S. Pat. No. 5,938,648 to LaVon et al. (Procter & Gamble Co., Cincinnati, Ohio). U.S. Pat. No. 5,938,648 also involves the use of expensive monolithic materials to act as both a barrier and a breathable layer concurrently.

EP 1 034 075 B1 to Boich (Coronor Composites GmbH) discusses a plastic film which is said to be water-tight and permeable to water vapor. The plastic film comprises at least three film layers which are said to be permanently bonded to one another. A first film layer comprises a plastic which allows the transport of water vapor on chemical pathways by absorption/desorption. The second and third film layers are provided with mineral additives, by which capillaries are implemented upon the stretching at the phase transition boundaries between plastic and mineral additives, and/or over the entire cross-section of the plastic film. The capillaries extend through the second film layer and allow the transport of water vapor on physical pathways. The layer which transports the water vapor on chemical pathways may comprise polyurethane, polyether block amide, a co-polyamide, a polyester derivative, polyester, a co-polyester, or mixtures of these materials, through which this film layer is absolutely water-tight. EP 1 034 075 B1 does not disclose the inclusion of an adhesive in the first film layer, nor that such an adhesive might be included in the multilayer film. The patent discloses that the first film layer has a thickness of 2 to 20 µm and the second film layer has a thickness of 1 to 10 µm.

The plastic film of Boich EP 1 034 075 B1 is very similar to the multilayer film described below as Comparative Example 1. That multilayer film suffered from delamination after contact with an alcohol and that in view of the similarity between Comparative Example 1 and Boich, it is submitted that the plastic film of Boich would likewise experience delamination after contact with an alcohol. Boich does not disclose a multilayer film which provides an effective barrier to alcohol based disinfectants.

U.S. Pat. No. 5,164,258 to Shida et al. discusses a multilayer structure which has a core layer of a hygroscopic barrier material and inner and outer surface layers designed to facilitate the escape of moisture which becomes absorbed in the core layer during retort sterilization. The inner and outer surface layers include a polyolefin material which is either foamed or compounded with a filler in order to cause a substantial increase in the water vapor transmission rate of the polyolefin. Adhesive layers are present between the core layer and the inner and outer layers. Each of the inner and outer layers may include one or more individual film layers, depending on the requirements of the specific packaging application.

U.S. Publication No. 20080131676 to Becke et al. (Pliant Corporation) discusses multilayer, microporous breathable barrier films and items such as laminates and garments made from such films. The films contain one or more layers of polymers without fillers in combination with at least two or more microporous breathable layers. The internal barrier layer(s) is placed in the film to impede the flow of liquids, liquid borne pathogens, and other microorganisms that may be carried by a liquid challenge. Typical materials for these barrier layers include, but are not limited to, linear low density polyethylene (LLDPE), low density polyethylene (LDPE), high density polyethylene (HDPE), ethylene/vinyl acetate (EVA), ethyl methacrylate (EMA), polypropylene (PP), copolymers of PP, copolymers of polyethylene (PE) and PP, derivatives thereof, and combinations thereof. A variety of additives may be added to the barrier layers to provide additional properties such as antimicrobial effects, odor control, and static decay.

Other common breathable films are microporous films. These films exhibit exceptional breathability, but do not provide a barrier to microorganisms and some liquids depending on the pore size and exposure conditions. Multilayer microporous films are also known in the art. U.S. Pat. No. 5,955,187 to McCormack (Kimberly-Clark Worldwide, Inc., Neenah, Wis.) discusses a self-regulating breathable microporous film layer that includes a voided polymer matrix and a plurality of fine water-swellable filler particles disposed within the voids. Multilayer microporous films having a microporous filled core layer and skin (outside) layers are discussed in U.S. Pat. No. 6,075,179, to McCormack et al. (Kimberly-Clark Worldwide, Inc., Neenah, Wis.) and U.S. Pat. No. 6,682,803 (Kimberly-Clark Worldwide, Inc., Neenah, Wis.). This skin/core concept does not impede the transmission of viruses or other challenge materials as they are able to pass through the cracks in the resultant film's outer skin layer Other methods of making microporous films involve the phase separation of various polymers, leaving voids and areas of low crystallinity as pathways for breathability. These pathway structures do not impede the transmission of viruses or other challenge materials as they are able to pass through the voids and amorphous areas in the film. These methods are described in U.S. Pat. No. 4,539,256 to Shipman, U.S. Pat. No. 5,260,360 to Mrozinski, U.S. Pat. No. 5,690,949 to Weimer, et al., U.S. Pat. No. 5,738,111 to Weimer, et al. (all five assigned to Minnesota Mining and Manufacturing Co., St. Paul, Minn.), and U.S. Pat. No. 5,938,874 to Palomo, et al. (Allegiance Corporation, McGaw Park, Ill.), among others.

U.S. Pat. No. 5,935,370 to Weimer (3M) discusses a microporous membrane material comprising (1) a thermoplastic polymer or polytetrafluoroethylene and (2) a water- and oil-repellent fluorochemical compound which provides said membrane with oleophobic, hydrophobic and viral barrier properties.

BRIEF SUMMARY OF THE INVENTION

The presently described technology, in general, relates to multilayer breathable films which provide a barrier to alcohol and/or viruses, and items such as laminates and garments made from such films. The films produced by the presently described technology contain one or more internal barrier layers of hygroscopic polymer disposed between two or more microporous breathable layers. Preferably the hygroscopic polymer is a polymer such as ε-caprolactone, a polyether block amide, a polyester, a polyamide, a derivative thereof, or a combination thereof. The internal barrier layer provides a barrier that can effectively allow moisture vapor to pass but not viruses or other pathogens, and it also provides a barrier to alcohol based disinfectant penetration. The present multilayer films produced by the presently described technology preferably contain one or more inner monolithic viral and alcohol barrier layers comprising a hygroscopic polymer and an adhesive, and at least two outer microporous breathable polymer layers.

It has been discovered that an adhesive can be included in the resin for preparing the internal barrier layer and/or the microporous layers in contact with the internal barrier layer, and that including such an adhesive can produce a multilayer film that is more resistant to delamination, including when contacted with isopropyl alcohol, and avoids large cavities between the barrier layer and microporous layers. Thus, in preferred embodiments of the present technology, one or more of the at least one internal barrier layer and the microporous layers comprises an adhesive, which may be the same adhesive or different adhesives or a combination of adhesives. Other layers may also include adhesives. Preferably both the internal barrier layer and the microporous layers in contact with the barrier layer comprise an adhesive. It is advantageous to include an adhesive in the resin for preparing the internal barrier layer and/or the microporous layers, rather than providing an adhesive layer between the internal barrier layer and the microporous layers, because an adhesive layer could interfere with or reduce breathability of the multilayer film.

As one aspect of the present technology, a multilayer breathable barrier film is provided. The multilayer film comprises at least one internal barrier layer. This internal barrier layer is moisture permeable and comprises a hygroscopic polymer. The multilayer film also comprises at least two microporous layers. These microporous layers may be the same or different. The internal barrier layer is disposed between the microporous layers and provides a barrier to alcohol and/or viruses. One or more of the internal barrier layer(s) and the microporous layers comprises an adhesive.

As another aspect of the present technology, a multilayer breathable alcohol and viral barrier film having at least three layers, alternatively at least five layers is provided. The multilayer film comprises at least one internal alcohol and viral barrier layer that is moisture permeable and comprises a hygroscopic polymer. The multilayer film also comprises at least two first microporous layers, which comprise at least one first polymer composition. The internal viral barrier layer(s) is disposed between the first microporous layers. The multilayer film also comprises at least two second microporous layers comprising at least one second polymer composition. The first and second polymer compositions may have the same polymer or different polymers and/or may include different components or ratios of components. Preferably the first and second polymer compositions are polyolefin compositions. Each of the second microporous layers is disposed on a surface of one of the first microporous layers opposite the internal viral barrier layer. In this multilayer film, one or more of the internal layer(s) and the first microporous layers comprises an adhesive.

As another aspect of the present technology, a multilayer breathable viral and alcohol barrier film is provided. The multilayer film comprises at least one internal viral and alcohol barrier layer. This internal layer is moisture permeable and comprises a hygroscopic polymer. The multilayer film also comprises at least two microporous layers, which may be the same or different. The internal viral barrier layer is disposed between the microporous layers. The multilayer breathable viral and alcohol barrier film has an alcohol penetration of less than 10% as measured by Pressure Penetration Through a Fabric (PPT) testing.

As yet another aspect of the present technology, a method is provided for producing a multilayer breathable alcohol and viral barrier film having at least one internal layer that is moisture permeable and provides an alcohol and viral barrier. The method comprises extruding two or more extrudable materials to form a multilayer structure having at least one internal layer and at least two polymer layers. The internal layer(s) is disposed between the polymer layers. Preferably the polymer layers are polyolefin layers. The internal layer comprises a hygroscopic polymer, such as a hygroscopic elastomer, a polyester, a polyimide, a polyether block amide, celluloses fiber, nitrocellulose fiber, derivatives thereof, and combinations thereof. One or more of the internal layer and the outer layers comprises an adhesive, which may be the same adhesive or different adhesives. Other layers may also include adhesives. The present method may also comprise stretching the multilayer structure so as to form micropores in the outer polymer layers. The multilayer structure is stretched in the machine direction or the cross direction or in a different manner, so as to open pores in the outer layers, or in other polymer layers between the outer layers and the internal layers, but without damaging or creating pores or cracks in the internal barrier layer. The alcohol and viral barrier layer comprising a hygroscopic polymer should be adapted for being stretched without creating openings or pores. The barrier layer may be substantially free of filler, or filler may be incorporated in the barrier layer as long as the stretching/orientation process does not create micropores in barrier layer. The present method can also comprise the step of preparing an alcohol and viral barrier layer resin as one of the extrudable materials by mixing the hygroscopic polymer and the adhesive before extruding. The present method can also comprise the step of preparing a filled polyolefin layer resin as one of the extrudable materials by mixing a polyolefin, a filler and the adhesive before extruding.

In various aspects and embodiments of the present technology, the internal alcohol and viral barrier layer comprises a blend of a hygroscopic polymer and an adhesive. In some embodiments, the internal barrier layer and each of the microporous layers in contact with the internal barrier layer comprises the adhesive, wherein the same or different adhesive is provided in each of the barrier layer and the microporous layers. The internal barrier layer is monolithic or essentially free of pores or cracks. Preferably the internal barrier layer is continuous throughout the multilayer film.

The present multilayer films have an internal viral barrier layer, for example, a monolithic hygroscopic layer that provides an acceptable level of breathability can be achieved while a viral barrier is maintained. Further, the internal layer provides a barrier to alcohol penetration, including penetration by alcohol based disinfectants that are commonly used in the medical field. The film structure of the presently described technology can accomplish these goals at a much lower barrier layer thickness than other films mentioned in prior art and at a cost that is appropriate for disposable end use applications. For example, when a monolithic inner layer comprising a hygroscopic polymer is used in accordance with the presently described technology, an acceptable level of breathability can be achieved through the thinning of the inner layer while a viral and alcohol barrier is maintained.

In some embodiments, the present technology provides a breathable plastic film comprising at least three layers, alternatively at least five layers, with at least one internal barrier layer comprising a hygroscopic polymer and an adhesive, and at least two outer surface layers comprising microporous polyolefin compositions. The microporous polyolefin compositions of the at least two outer surface layers can be the same or different.

Alcohol penetration can be measured as the percentage of the surface area of the blotter paper having red blots after a multilayer film is tested in the Pressure Penetration Through a Fabric (PPT) test described below. In some embodiments, the multilayer films are essentially impervious to one or more of water, methyl alcohol, ethyl alcohol, blood, body fats and oils, saliva, and surfactant-containing disinfectants. In some embodiments, the multilayer films have an isopropyl alcohol penetration of less than 10%, alternatively less than 5%, alternatively less than 2%. In some embodiments, the multilayer films are essentially impervious to alcohol, particularly isopropyl alcohol.

Preferably, the present multilayer films have a basis weight from about 10 g/sq. meter to about 150 g/sq. meter, alternatively from about 15 g/sq. meter to about 50 g/sq. meter. The present multilayer breathable films can have a breathability of at least about 300 grams/square (sq.) meter/day, alternatively at least about 700 grams/sq. meter/day, at least about from about 1000 grams/sq. meter/day, or at least about from about 1500 grams/sq. meter/day. For example, the breathability can range from about 1500 grams/square (sq.) meter/day to about 20,000 grams/sq. meter/day, alternatively from about 1000 GSM/day to about 12,000 GSM/day. More preferably, the film can pass viral barrier testing such as ASTM F-1670, impeding the passage of artificial blood solutions, viruses, bacteria, and fluids and/or passes ASTM F-1671 testing.

In another aspect, the presently described technology provides an article or garment produced using a breathable plastic film comprising at least three layers, with at least one internal barrier layer comprising a hygroscopic polymer and an adhesive, and at least two outer surface layers comprising microporous polymer compositions.

In still another aspect, the presently described technology provides a laminate comprising a breathable plastic film further comprising at least three layers, alternatively at least five layers, with at least one internal barrier layer made from a hygroscopic polymer and an adhesive, and at least two outer surface layers made from microporous polyolefin compositions, and a fabric or nonwoven material bonded to at least one side of the film. Preferably, the laminate of the present technology can pass viral barrier testing such as ASTM F-1670 or can pass ASTM F-1671 testing. More preferably, the laminate of the present technology has a breathability of at least about 1000 grams/sq meter/day.

In yet another aspect, the presently described technology provides a laminate with at least one layer of nonwoven material bonded to at least two or more layers of breathable barrier film of the present technology. Preferably, the resultant laminate can pass ASTM F-1670 or ASTM F-1671 testing. More preferably, the laminate has a water vapor transmission rate (WVTR) of at least 1000 grams/sq meter/day when measured by, for example, a MOCON PERMATRAN-W® Model 100K tester.

In yet another aspect, the presently described technology provides an article or product for blocking liquid borne pathogens and transporting moisture vapor by using the film or laminate of the present technology.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1A through 1D shows photographs of blotter paper from multilayer films subjected to isopropyl alcohol penetration testing.

DETAILED DESCRIPTION OF THE INVENTION

Figure 1A:
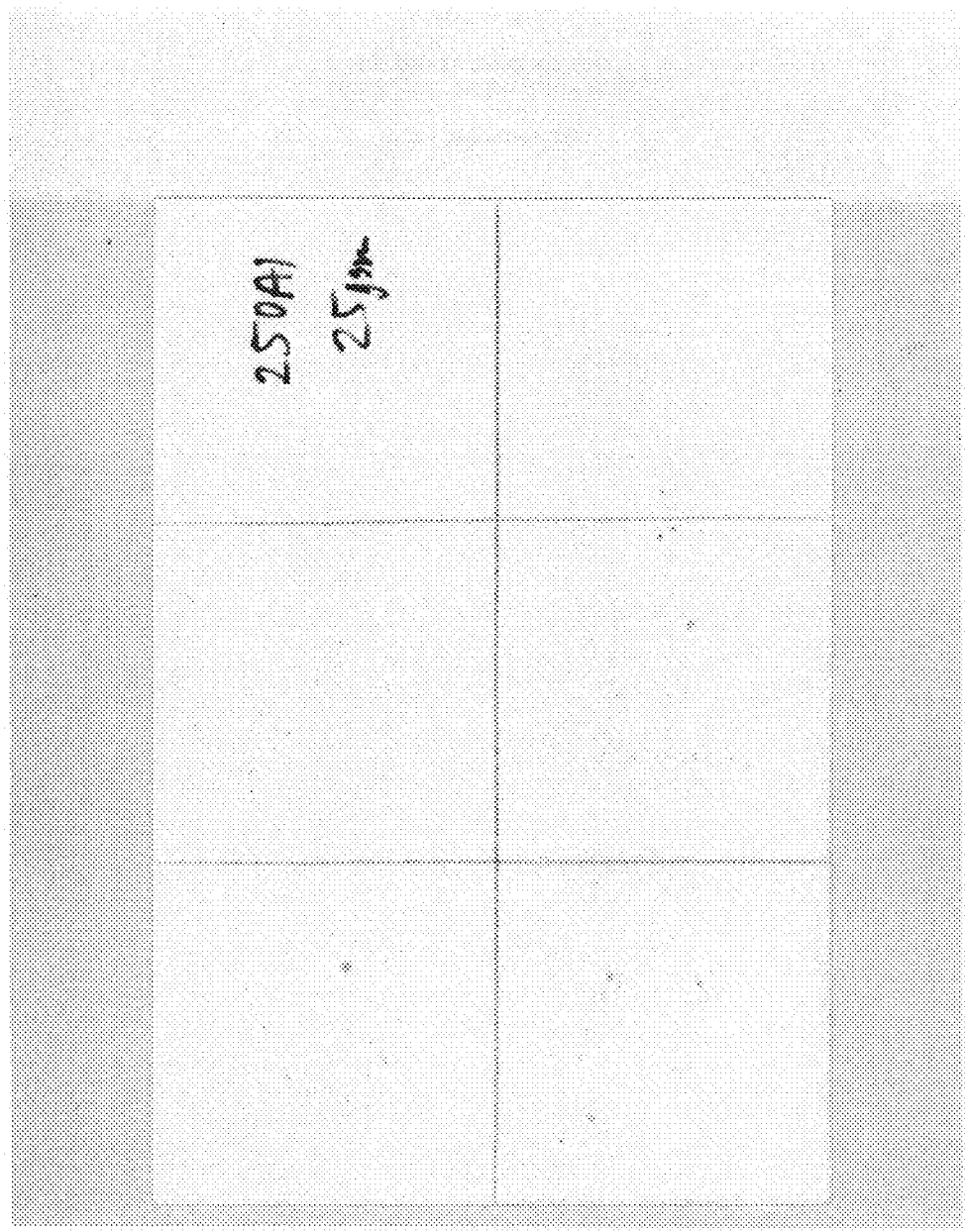

The presently described technology generally relates to a multilayer film (such as a coextruded film) comprising at least two layers of microporous polymers with one or more internal barrier layers of hygroscopic polymers, such as hygroscopic elastomers, polyether block amides, polyester elastomers and other polyesters, polyamides, celluloses, derivatives thereof and combinations thereof. Preferably, the microporous polymers are filled, more preferably, at a high or significant (from about 30% to about 80%) level by weight, and the hygroscopic polymers for the internal alcohol and viral barrier layers are unfilled or substantially unfilled or filler may be incorporated in the core layer as long as the stretching/orientation process does not create micropores in core layer.

Compared to the breathable films existing in the art, various embodiments of the multilayer film of the presently described technology have one or more of the following advantages: (a) retains a much thinner monolithic barrier layer than other films mentioned in prior art; (b) retains a much thinner monolithic internal barrier layer than other films mentioned in prior art after the extruded multilayer structure is stretched to open micropores; (c) the monolithic barrier layer is protected by outer microporous layer and reduces the risk of pin holing that punches by foreign material; can be laminated with fabric by a thermo-bonding method; (d) is cost effective versus hydrophilic monolithic thermoplastics; (e) does not delaminate to a significant degree after contact with alcohol; (f) can allow for moisture vapor transmission through a breathable barrier suitable in multiple applications; and (g) can be resistant to the passage of viruses and other microbial challenge materials.

In accordance with at least one embodiment, the multilayer films of the presently described technology comprise at least two layers of filled polymers and at least one inner layer of hygroscopic polymer. The extrudable materials used for making the films are coextruded and then stretched to open micropores in filled layers between the polymers and the non-extensible filler materials. The precursor films can be stretched by machine direction stretching, trans machine stretching, or stretching on interdigitating rolls. In machine direction stretching, the precursor film is stretched in the machine direction over a series of heated rolls that run at increasing speeds to stretch the film in the machine direction. This layer construction, when stretched, allows breathability for moisture vapor while maintaining a barrier for fluids such as water, blood, and other bodily fluids. While machine direction orientation as described is a preferred orientation method, other methods of film stretching and orientation can be used to achieve the same result. These methods include, but are not limited to, biaxial orientation, transverse direction orientation, and incremental stretching via intermeshing gears, either mono- or bi-axially.

In accordance with at least one embodiment, the multilayer film of the presently described technology comprises at least two breathable layers of inorganic or organic filler-containing polymer. The breathable layers can be prepared from polymers such as polyolefin, styrenic copolymer, vinyl acetate copolymers, ethyl methacrylate (EMA) polymers, polypropylene (PP), copolymers of PP, copolymers of polyethylene (PE) and PP, derivatives thereof, and others. The polyolefin can be polyethylene, such as low density polyethylene (LDPE), high density polyethylene (HDPE), linear low density polyethylene (LLDPE) or ultra low density polyethylene (ULDPE), or polypropylene, a copolymer (such as a copolymer of ethylene, propylene and/or another alpha-olefin), or a mixture of polyolefins.

The filler can be uniformly dispersed in the polymer matrix and can be added at levels ranging from about 20% to about 75% by weight, alternatively from about 45% to about 70% by weight. The filler can have a mean particle size from about 0.1 micron to about 15 microns. The filler can comprise, for example, calcium carbonate, barium sulfate, talc, silica, clay, glass spheres, or other inorganic particles, organic fillers, organic domains (e.g., polyamides, polyacrylates, styrenes, polystyrenes, and the like), derivatives thereof, or a combination thereof. These breathable layers preferably can constitute from about 60% to about 99.9%, alternatively from about 70% to about 99.5%, alternatively from about 80% to about 99% of the total thickness of the multilayer film.

The multiple breathable layers of the present technology can differ from each other in thickness, breathability, pore size, and thermoplastic composition. For example, if the film is used in a composite, a different thermoplastic may be used in the two outer film skin layers to increase adhesion on one or more sides. The type of desired thermoplastic for a specific use would depend on, for example, the lamination technology used as well as process factors. The thickness of each layer can range from about 1% to about 99.5% of the total film thickness as measured by thickness percentage. For example, breathable layers A, C, D and/or E can range from about 20 to about 50% of the total thickness of the multilayer film. In some embodiments of the present multilayer films, the internal barrier layer has a thickness less than 35 microns, alternatively less than 10 microns, alternatively less than 5 microns, alternatively less than 3 microns, alternatively less than 2 microns, alternatively less than 1 micron.

Further, the breathability, pore size, and quantity of pores are affected by the technology used to stretch the film as well as the specific formulation of the breathable layer. Additives can be added for process needs and for inclusion of additional properties including, but not limited to, pigmentation, antioxidation, antimicrobial effects, odor control, and static decay. Choice of pigment from different suppliers may have effects on the extrusion process.

In addition to the breathable layers, the multilayer films of the present technology also comprise at least one internal alcohol and viral barrier layer. The internal layer provides a barrier to viruses and to alcohol penetration. Typical extrusion technology utilizes a tie layer to combine dissimilar layers. The present technology blends an adhesive in one or more of the adjacent dissimilar layers and by this means avoids a loss in permeability associated with a continuous non-breathable tie layer. The internal barrier layer can comprise a hygroscopic polymer, and also can comprise an adhesive. The internal barrier layer comprises a hygroscopic polymer after it is prepared from a hygroscopic polymer resins or from a combination of resins such as a blend of the hygroscopic polymer and one or more adhesives. The internal alcohol and viral barrier layer can make up from about 0.5% to about 30% of the thickness of the film, alternatively from about 1% to about 20% of the total thickness, alternatively from about 2% to about 10%, as measured by thickness percentage. The percentage thickness can be made up of a single layer or the sum of separate barrier layers within the film. The present films can comprise one or more of the internal alcohol and viral barrier layers, either contiguous with each other or with interposed microporous layers. Preferably, the internal barrier layer(s) are monolithic, and they do not contain fillers that provide sites for development of micropores, although additives for other purposes or properties may be used.

Suitable materials for the present internal alcohol and viral barrier layers include, but are not limited to, hygroscopic polymers such as ε-caprolactone (available from Solvay Caprolactones), polyether block amides (available from Arkema PEBAX), polyester elastomer (such as Dupont Hytrel or DSM Arnitel) and other polyesters, polyamides, celluloses (for example, cellulose fibers), nitrocelluloses (for example, nitrocellulose fibers), derivatives thereof, and combinations thereof. Also contemplated as materials for the internal barrier layer are ionomers, such as ethylene ionomers. Fatty acid salt modified ionomers are described in Chen, "Development of New Ionomers With Novel Gas Permeation Properties", *Journal of Plastic Film and Sheeting*, Vol. 23, No. 2, 119-132 (2007). Sodium, magnesium, and/or potassium fatty acid salt modified ionomers may provide desirable water vapor transmission properties. In some embodiments, the barrier layer is selected from the group consisting of hygroscopic elastomers, polyesters, polyamides, polyetherester copolymers (e.g., a block polyetherester copolymer), polyetheramide copolymers (e.g., a block polyetheramide copolymer), polyurethanes, polyurethane copolymers, poly(etherimide) ester copolymers, polyvinyl alcohols, ionomers, celluloses, nitrocelluloses, derivatives thereof and combinations thereof. Preferred copolyether ester block copolymers are segmented elastomers having soft polyether segments and hard polyester segments, as disclosed in U.S. Pat. No. 4,739,012. Suitable copolyether ester block copolymers are sold by DuPont under the name Hytrel®. Suitable copolyether amide polymers are copolyamides available under the name Pebax® from Atochem Inc. of Glen Rock, N.J., USA. Suitable polyurethanes are thermoplastic urethanes available under the name Estane® from the B.F. Goodrich Company of Cleveland, Ohio, USA. Suitable copoly(etherimide) esters are described U.S. Pat. No. 4,868, 062. The internal barrier layer may include or be blended with a thermoplastic resin. Suitable thermoplastic resins for preparing these films include polyolefins, polyesters, polyetheresters, polyamides, polyether amides, and urethanes. Examples of suitable thermoplastic polymers include, by way of illustration only, such polyolefins as polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like; such polyesters as poly(ethylene terephthalate), poly(butylenes)terephthalate, poly(tetramethylene terephthalate), poly(cyclohexylene-1,4-dimethylene terephthalate) or poly(oxymethylene-1,4-cyclohexylenemethyleneoxyterephthaloyl), and the like; such polyetheresters as poly(oxyethylene)-poly(butylene terephthalate), poly(oxytetramethylene)-poly(ethylene terephthalate), and the like; and such polyamides as poly(6-aminocaproic acid) or poly(-caprolactam), poly(hexamethylene adipamide), poly(hexamethylene sebacamide), poly(11-aminoundecanoic acid), and the like. Preferably the hygroscopic polymer is a hygroscopic elastomer. A variety of additives may be added to the barrier layers to provide additional properties such as antimicrobial effects, odor control, and static decay. The internal alcohol and viral barrier layer(s) is placed in the film to impede the flow of liquids, liquid borne pathogens, viruses, and other microorganisms that may be carried by a liquid challenge.

The internal barrier layer(s) and/or the breathable layers can include one or more adhesives for adhering the internal viral barrier layers to contiguous layers to form a multilayer film. The term "adhesive" as used herein includes any components suitable for adhering two or more layers together. Preferred adhesives are compatibilizing adhesives that increase the compatibility of the layers as well as adhering the layers to one another. The adhesives can be included in the resin or other extrudable material before extruding that resin into the inner barrier layer. Suitable compatibilizing adhesives include polyethylene/acrylate copolymer, ethylene/methyl acrylate copolymer, acid-modified acrylate, anhydride-modified acrylate, ethylene vinyl acetate, acid/acrylate-modified ethylene vinyl acetate, and anhydride-modified ethylene vinyl acetate. When either the breathable layer or the barrier layer (but not both) comprises an adhesive, it is preferable that the adhesive has a relatively high methacrylate content, for example a methacrylate content of at least about 20% or at least about 25%. In some embodiments of the present multilayer films, the internal barrier layer can be prepared from blends comprising up to 50% by weight adhesive and 50% by weight or more hygroscopic polymer.

In some embodiments of the present process, the hygroscopic polymer may be dried before it is extruded. It has been found that feeding predried hygroscopic elastomer in small amounts to the extruder was effective in avoiding absorbing moisture, preventing hydrolysis of the hygroscopic elastomer and reducing or eliminating the formation of dark blue gels and holes in web. In some higher stretch ratio cases, gels rendered holes and even web break.

Single or multiple barrier layers may be incorporated into the film and can be placed in any order in the inner layers of the film structure. Preferably, the barrier layers are not to be placed on the outer surface of the resultant film in order to avoid pin holes being punched by foreign material due to lack of proper protection. For higher effectiveness, it is preferred that multiple barrier layers are not placed next to each other inside the film. When multiple barrier layers are used, the barrier layers in the film can differ from each other in thickness and thermoplastic type.

In accordance with at least one embodiment of the presently described technology, a suitable structure contains five layers, with one barrier layer being in the core of the structure and four breathable layers (A-C or C-A) in an A-C-B-C-A structure for the resultant film, wherein A refers to a breathable layer, C refers to a different kind of breathable layer, and B refers to the barrier layer. As one example, the outermost breathable layer (A and/or C) contains Dow 5230G LLDPE or Dow PL1280 ULDPE or Dow 5630 LLDPE, and calcium carbonate, with additional antioxidants, colorants, and processing aids possibly added. Further, different levels of calcium carbonate as well as other filler materials such as barium sulfate, talc, glass spheres, or other inorganic particles, derivatives thereof, or a combination thereof can be used in the breathable layers. The inner layer (B) in this example contains a hygroscopic elastomer such as Dupont HYTREL PET and an adhesive such as Dupont BYNEL 3101 20% EVA or Dupont AC1820 acrylate, with additional antioxidants, colorants, and processing aids possibly added. The inner layer (B) in this particular example contains about 50% adhesive and about 50% by weight or more hygroscopic elastomer. Instead of a polyester elastomer, other hygroscopic polymers, such as E-caprolactone, polyester block amides, polyester elastomers, polyamides, and blends thereof can be utilized as the inner barrier layers.

The presently described technology is not limited to any specific kind of film structure. Other film structures can achieve the same or similar result as the five-layer structure disclosed above. The limitation on film structures is a function of equipment design and capability. For example, the number of layers in a film of the present technology only depends on the technology available and the need of the end uses of the film. Structure examples suitable for the presently described technology include, but are not limited to, the following, where A and C are outer microporous layers and B is an internal alcohol and viral barrier layer:

A-B-A
A-A-B-A
A-B-A-A
A-A-B-A-A
A-B-A-A-A
A-B-A-B-A
A-B-A-A-A-A-A
A-A-B-A-A-A-A
A-A-A-B-A-A-A
A-B-A-A-A-B-A
A-B-A-A-B-A-A
A-B-A-B-A-A-A
A-B-A-B-A-B-A
A-B-A-A-A-A-A
A-A-B-A-A-A-A
A-A-A-B-A-A-A
A-B-A-A-A-B-A.

It should be understood that the multiple "A" breathable layers in each of the example structures above can be the same or different kind of microporous layer. Further, it is contemplated that each "A" breathable layer in the above structures could comprise two or more breathable layers in order to better control other film properties, such as the ability to bond to nonwovens. For example, when there are two breathable layers in one "A" breathable layer in the above structures, some exemplary film structures can be shown as follows, where C is the second breathable layer:

A-C-B-C-A
A-C-A-C-B-C-A
A-C-B-C-A-C-A
A-C-A-C-B-C-A-C-A
A-C-B-C-A-C-A-C-A
A-C-B-C-A-B-C-A

Additionally, it is known in the film industry that die technology is available to produce multiple layers in a multiplier fashion so that, for example, an ACA structure could conceivably be multiplied from about 10 to 1000 times. The resulting 10-time multiplied ABA structure can be expressed as follows:

A-B-A-A-B-A-A-B-A-A-B-A-A-B-A-A-B-A-A-B-A-A-B-A-A-B-A

This technology can be used in combination with the presently described technology, and such application is contemplated within the spirit and scope thereof.

The multilayer film of the presently described technology can be extruded at a basis weight of from about 10 grams/sq. meter to about 150 grams/sq. meter, alternatively from about 20 grams/sq. meter to about 75 grams/sq. meter on a cooled chill roll and either wound as a precursor film or fed directly into a machine direction orientation (MDO) stretching unit or other type of orientation or stretching unit as described above. Preferably the blends for the breathable and barrier layers are coextruded through a T-die. The extruded layers are then stretched in uniaxial direction at a temperature around the softening points of polyolefins to form cavitation around fillers, while still maintain continuity and/or integrity of the barrier layer. The film can be stretched from about 100% to about 800%, alternatively from about 200% to about 600% in length to induce micropores. With respect to draw ratios, it should be understood by those skilled in the art, for example, that a 100% stretch is achieved by operating the second set of rollers at a speed twice that of a first set of rollers, resulting in a draw ratio of 2.0. The film can be further heated and allowed to anneal to relieve from about 2% to about 30% of the stress induced by the stretching operation.

In accordance with at least one embodiment, the multilayer film is from about 10 grams/sq. meter to about 75 grams/sq. meter, alternatively from about 12 grams/sq. meter to about 36 grams/sq. meter thick, alternatively from about 15 grams/sq. meter to about 30 grams/sq. meter in basis weight. The finished film can then be wound onto cores for sale or for further processing in, for example, lamination equipment. The resultant breathability achieved for the films can be from about 300 grams (g)/sq. meter (sqm or $m^2$)/day (24 hours (hr)) to about 30,000 g/sqm/day, alternatively from about 1000 to 12000 g/sqm/day. A preferred film of at least one embodiment of the presently described technology has a breathability of from about 3,000 to about 10,000 g/sqm/day and has a thickness of about 20-35 g/sqm. Preferably, the films of the present technology pass ASTM F-1670 or ASTM F-1671 testing standards. In so doing, the films prevent passage of artificial blood and provide a barrier to viral solutions such that no significant growth occurs in cultures taken from beyond the barrier. Breathability in the presently described technology can be tested by a Mocon PERMATRAN-W® Model 100K machine at 37.8° C. (100° F.) and 100% relative humidity. Use of this testing equipment is an industry practice that those working in the industry will appreciate how to execute.

The multilayer films of the presently described technology are useful for preparing laminates or other structures that are useful for breathable barrier applications. In the presently described technology, the film may be laminated using adhesive, binder fiber, or powder, autogenously using thermal or ultrasonic bonding, or any other method available in the art. Preferably, the laminate made from the films of the present technology can pass ASTM F-1670 or ASTM F-1671 testing standards. Also preferably, the laminate or structures made from the films of the present technology exhibit breathability of at least 1000 grams/sq meter/day, when measured by, for example, a MOCON PERMATRAN-W® Model 100K tester.

Possible applications using the materials of the present technology include, but are not limited to, medical gowns, diaper back sheets, drapes, packaging, garments, articles, carpet backing, upholstery backing and bandages. They also have uses in, for example, protective apparel, feminine hygiene, building construction, and bedding. The present films can be laminated to a fabric, scrim, or other film support, by thermal, ultrasonic, or adhesive bonding. The support can be attached to at least one face of the film and or to both faces. The laminate can be made using wovens, knits, nonwovens, paper, netting, or other films. Adhesive bonding may be used to prepare such laminates. Adhesive bonding with adhesive agents such as powders, adhesive webs, liquid, hot melt and solvent based adhesives, is also contemplated. Additionally, these types of support can be used with ultrasonic or thermal bonding if the polymers in the support are compatible with the film surface. Laminates of the present multilayer films and nonwoven fabrics may provide surgical barriers. Spunbonded or spunbond-meltblown-spunbond (SMS) fabrics are preferred, however spunlaced, airlaid, powder bonded, thermal bonded, resin bonded may also be employed. The encasing of the breathable monolithic barrier protects the barrier layer from mechanical damage or thermal damage and allows for thermal and ultrasonic bonding of the multilayer film at extremely low thicknesses.

The present multilayer films are expected to have other applications in the medical field. Porous webs are used currently in the medical field for Ethylene Oxide (EtO) sterilization as the gas must be able to permeate packaging in order to sterilize the contents. These porous webs are often used as the top sheets for rigid trays and as "breather" films in pouches. Medical paper is commonly used for these purposes as is Tyvek (spunbond HDPE). The present films could be used to replace either of these products in these applications. A possible reason why microporous films have not been used often in this industry is a concern that the variable size of the pores of microporous films could make them a less effective barrier against viruses or microbes. The internal barrier layer of the present multilayer films would address that concern. Further, the microporous layers of the present multilayer films can be manufactured with polyethylene and this material will heat seal well with polyethylene layers commonly used on many packaging materials. The higher melting temperature of the HDPE used in Tyvek makes it more difficult to heat seal effectively and the medical paper does not seal unless coated with a dot pattern or other permeable coating. The present film may be used as a top web or other component of medical packaging which is capable of responding to pressure changes that may occur with altitude changes during shipping. Finally, sterilization gases such as ozone or hydrogen peroxide might react with medical paper and the present multilayer films could be suited to work with these sterilization gases.

It is contemplated that any application that involves a blood barrier could be a suitable application of the present technology. For example, disposable blankets, operating table covers, or surgical drapes comprising the present multilayer films are contemplated, as they represent blood barrier applications that might function more comfortably with a breathable substrate.

The presently described technology and its advantages will be better understood by reference to the following examples. These examples are provided to describe specific embodiments of the present technology. By providing these specific examples, the inventors do not limit the scope and spirit of the present technology. It will be understood by those skilled in the art that the full scope of the presently described technology encompasses the subject matter defined by the claims appending this specification, and any alterations, modifications, or equivalents of those claims.

Pressure penetration of simulated blood was tested using the "Pressure Penetration Through a Fabric (PPT)" test. The PPT test is used to determine whether or not, and to what degree, simulated blood penetrates through a fabric or film under pressure for a specified time.

A sample is placed on a blotter paper on a flat surface and challenged by a 70% IPA/water solution containing Astrazon Red Violet dye for 3 minutes while under a 1 psi load. The number of red spots showing on the blotter paper are determined and recorded. The test solution contains 70% IPA/30% DI water with 0.1% (1 gram per liter or 0.1 gm per 100 ml) of Astrazon Red Violet 3RN liquid dye added for visibility. This method is performed in a lab at standard atmosphere for testing textiles: 70 F, (20 C), 65% RH.

In the PPT test, the pre-marked blotter paper is laid on a hard, flat surface near a sink. A 3"×3" test specimen is placed, face side up, on the blotter on each of the 4 or 6 pre-marked lane squares. A 2"×2"" piece of absorbent spun-bond non-woven fabric is placed in the center of each specimen. A pipette is filled with the test solution and the 2"×2" NW is saturated with it. A cylindrical, 2.0" diameter; 3.14 lb (1.0 psi) weight is placed on top of the saturated specimen and a timer is started. After 3.0 minutes, the weights are removed and all except the blotter paper are discarded. The blotter paper is examined, and all red spots are counted. The number of red spots are recorded. A size limit may be specified for red spots to be counted. If one large red blotch is present, the result may be recorded as "99".

Comparative Examples 1 and 2

Comparative Examples 1 and 2 are multilayer films. Example 1 (XP9538G) was a multilayer film having an A-C-B-C-A structure, prepared by extruding resin blends for layers A, C and B described in Table 1. This Example was prepared in a manner very similar to EP1034075B1 and is believe to reflect its properties. In the preparation of Example 1, the film has a basis weight of 25 grams/sq. meter. Example 1 performed well in WVTR testing. However, when the multilayer film was contacted with isopropyl alcohol disinfectant, the layers of the film delaminated and failed in PPT testing. Delamination after contact with isopropyl alcohol or other alcohols was deemed to be unacceptable for a multilayer film for use in medical applications such as hospital ware, since medical personnel often use IPA as a sterilant or decontaminant.

Example 2 (XP9538H) was a multilayer film having an A-C-B-C-A structure, prepared by extruding resin blends for layers A, C, and B, described in Table 2. In the preparation of Example 2, the film has a basis weight of 50 grams/sq. meter. Example 2 also performed well in WVTR testing, but also suffered delamination when contacted with isopropyl alcohol. Table 2 provides data for the multilayer film of Example 2.

Inventive Examples 3 to 7

Example 3 (XP9538S-250) was a multilayer film having an A-C-B-C-A structure, prepared by extruding resin blends for layers A, C and B described in Table 3. Example 3 (XP9538S-250) was a multilayer film having an internal alcohol and viral barrier layer B prepared from a blend comprising a hygroscopic elastomer (DuPont Hytrel PET) and an adhesive (DuPont 1224AC EMA). A microporous layer C is adhered to and disposed on either side of internal layer B. Layer C also comprises an adhesive, in that it was prepared from a blend comprising linear low density polyethylene (Dow 5230G), a resin containing calcium carbonate as filler (Standridge SCC-13922), and an adhesive (DuPont 1224AC EMA). The multilayer film was stretched after extrusion so that micropores were formed in outer layers A and C. In the preparation of Example 3, the film has a basis weight of 25 grams/sq. meter. This multilayer film was essentially impervious to isopropyl alcohol, did not delaminate to an appreciable extent after contact with IPA, and had acceptable water vapor transmission.

Example 4 (XP9538S-01) was a multilayer film having an A-C-B-C-A structure, prepared by extruding resin blends for layers A, C and B described in Table 4. Example 4 (XP9538S-01) was a multilayer film having an internal alcohol and viral barrier layer B prepared from a hygroscopic elastomer (DuPont Hytrel). A microporous layer C is adhered to and disposed on either side of internal layer B. Layer C comprises an adhesive, in that it was prepared from a resin containing polyolefin and calcium carbonate as filler (Standridge SCC-13922), and an adhesive (DuPont 1218AC 18% EMA). The multilayer film was stretched after extrusion so that micropores were formed in outer layers A and C. In the preparation of Example 4, the film has a basis weight of 20 grams/sq. meter. This multilayer film was essentially impervious to isopropyl alcohol, did not delaminate to an appreciable extent after contact with IPA, and had acceptable water vapor transmission.

Example 5 (XP9538S-02) was a multilayer film having an A-C-B-C-A structure, prepared by extruding resin blends for layers A, C and B described in Table 5. Example 5 (XP9538S-02) was a multilayer film having an internal alcohol and viral barrier layer B prepared from a hygroscopic elastomer (DuPont Hytrel PET). A microporous layer C is adhered to and disposed on either side of internal layer B. Layer C comprises a different adhesive than in Example 4, in that it was prepared from a resin containing polyolefin and calcium carbonate as filler (Standridge SCC-13922), and an adhesive (DuPont 1913AC 13% EMA). The multilayer film was stretched after extrusion so that micropores were formed in outer layers A and C. In the preparation of Example 5, the film has a basis weight of 25 grams/sq. meter. This multilayer film was essentially impervious to isopropyl alcohol, did not delaminate to an appreciable extent after contact with IPA, and had acceptable water vapor transmission.

Example 6 (XP9538S-252) was a multilayer film having an A-C-B-C-A structure, prepared by extruding resin blends for layers A, C and B described in Table 6. Example 6 (XP9538S-

252) was a multilayer film having an internal alcohol and viral barrier layer B prepared from a hygroscopic elastomer (DuPont Hytrel PET) and an adhesive (DuPont AC1218 acrylate). A microporous layer C is adhered to and disposed on either side of internal layer B. Layer C comprises a different adhesive than in Example 4, in that it was prepared from a metallocene ultra low density polyethylene (ULDPE) polyolefin (DuPont PL1280), a resin containing polyolefin and calcium carbonate as filler (Standridge SCC-13922), and an adhesive (DuPont AC1218 acrylate). The multilayer film was stretched after extrusion so that micropores were formed in outer layers A and C. In the preparation of Example 6, the film has a basis weight of 25 grams/sq. meter. This multilayer film was essentially impervious to isopropyl alcohol, did not delaminate to an appreciable extent after contact with IPA, and had acceptable water vapor transmission.

Example 7 (XP9538S-253) was a multilayer film having an A-C-B-C-A structure, prepared by extruding resin blends for layers A, C and B described in Table 3. Example 3 (XP9538S-253) was a multilayer film having an internal viral barrier layer B prepared from a blend comprising a hygroscopic elastomer (DuPont Hytrel PET) and an adhesive (DuPont 3101 EVA). A microporous layer C is adhered to and disposed on either side of internal layer B. Layer C also comprises an adhesive, in that it was prepared from a blend comprising linear low density polyethylene (DuPont 5630), a resin containing calcium carbonate as filler (Standridge SCC-19322), and an adhesive (DuPont 3101 EVA). The multilayer film was stretched after extrusion so that micropores were formed in outer layers A and C. In the preparation of Example 7, the film has a basis weight of 35 grams/sq. meter. This multilayer film was essentially impervious to isopropyl alcohol, did not delaminate to an appreciable extent after contact with IPA, and had acceptable water vapor transmission.

Example 8

Figure 1B:
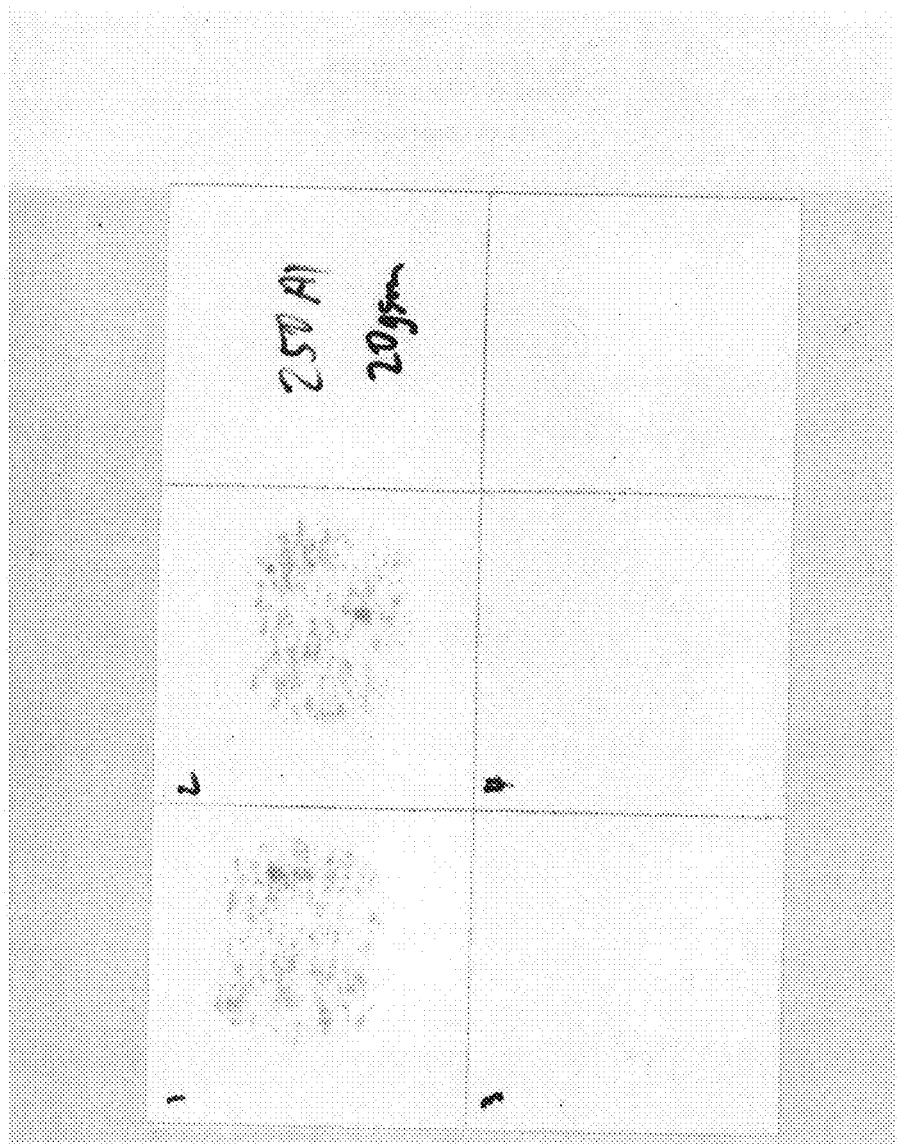
Figure 1C:
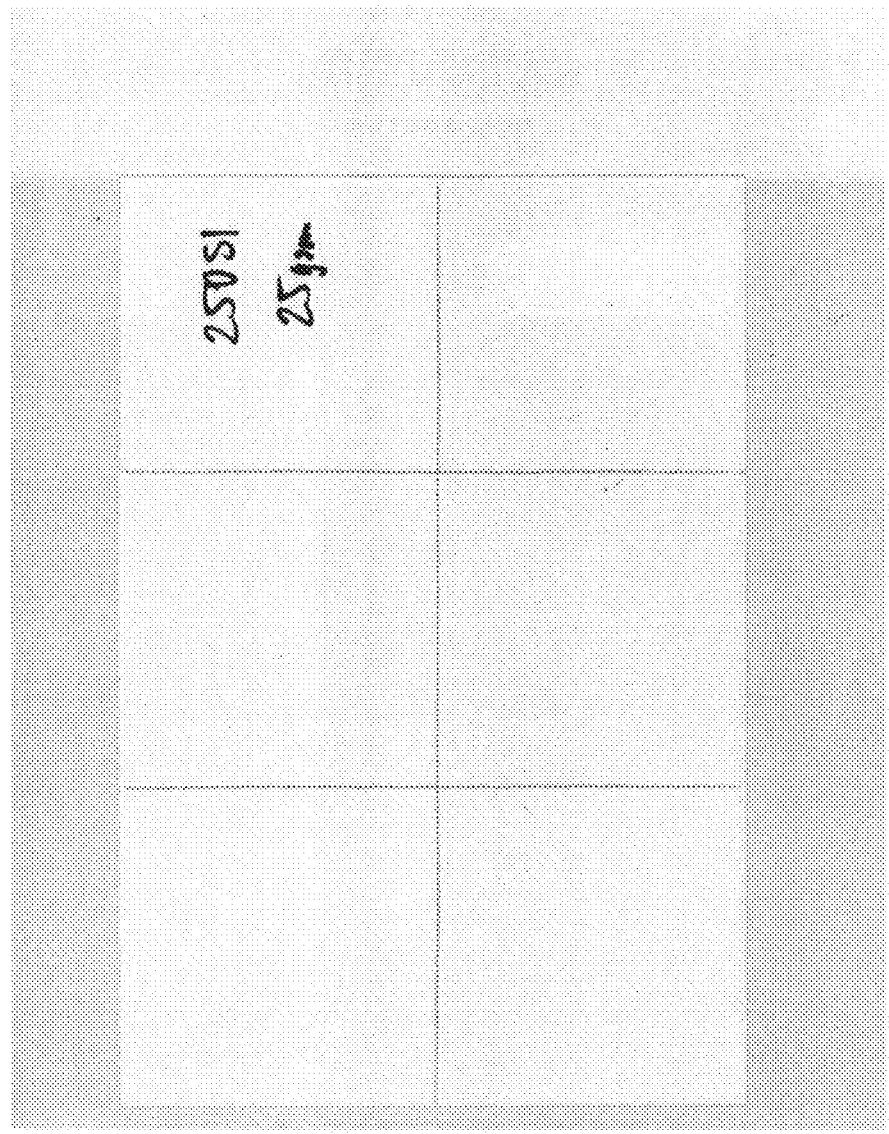

FIGS. 1A through 1D show photographs of blotter papers from multilayer films subjected to isopropyl alcohol disinfectant penetration testing. More particularly, FIG. 1A shows the blotter paper from the PPT test described above, performed on a sample of multilayer film XP9538S-250 A1 (having the layers described in Table 3), manufactured at a basis weight of about 25 grams per square meter. The film performed well in the PPT test, having red dots in less than 5% of the surface area. FIG. 1B shows the blotter paper from the PPT test, performed on a sample of multilayer film XP9538S-250 A1 (having the layers described in Table 3), manufactured at a basis weight of about 20 grams per square meter. The film did not perform as well in the PPT test, having red dots in greater than 5% of the surface area. FIG. 1C shows the blotter paper from the PPT test described above, performed on a sample of multilayer film XP9538S-250 S1 (having the layers described in Table 3), manufactured at a basis weight of about 25 grams per square meter. The film performed well in the PPT test, having red dots in less than 2% of the surface area. FIG. 1D shows the blotter paper from the PPT test described above, performed on a sample of multilayer film XP9538S-252 S1 (having the layers described in Table 6), manufactured at a basis weight of about 25 grams per square meter. The film performed well in the PPT test, having red dots in less than 2% of the surface area.

Example 9

Table 8 provides running conditions for preparing multilayer films on Pliant Corporation's extrusion equipment. The first two columns reflect different runs of XP9538S-250 with slight differences in stretch and speed at Draw Rolls #3 and #4. The differing running parameters yielded films having different WVTRs, suggesting that a higher stretch and speed at some draw rolls may yield a film having a higher WVTR. The third column shows running conditions for XP95385-252, a different embodiment of the present multilayer films. (See Example 6 and Table 6.)

Example 10

Breathability testing of samples was done using a Mocon PERMATRAN-W® Model 100K tester. Table 9 reports consolidated WVTRs for a variety of multilayer films of varying composition, basis weight and stretch ratio. The WVTR values reported in Table 9 are averages (along with the standard deviation) from multiple tests on the samples. In Table 9, the Sample Description also shows the draw ratio, speed, used for preparing the film subjected to the WVTR testing. The data shown in Table 9 demonstrate that the present multilayer films, represented by two embodiments of XP9538S (having different draw ratios), exhibit acceptable moisture transmission, making such multilayer films suitable for usage where a breathable film is desired.

Example 11

Viral testing under ASTM F-1671 was conducted by Nelson Laboratories Inc. 6280 S. Redwood Road, Salt Lake City, Utah 84123. Six samples of a laminate comprising an embodiment of the present multilayer film were tested. The multilayer film had the following components and specifications: XP9538S-250 A1 and XP9538S-252, both at 20 GSM and 25 GSM. All six samples passed, and no visual penetration was observed.

TABLE 1

Specification: XP9538G (Comparative Example 1)

| Layer | Layer Percent | Resin Supplier | Resin Number | Type | Melt Index | Resin Density | Percent Within |
|---|---|---|---|---|---|---|---|
| A | 47.0% | Standridge | SCC-13922 | CaCO$_3$ Compound | 6.5 | 1.800 | 75.0% |
|  |  | Dow | 5230G | LLDPE | 4.0 | 0.916 | 18.0% |
|  |  | Ampacet | 10562 | Process aid | 2.0 | 0.918 | 2.0% |
|  |  | Standridge | 27933 | blue | 6.0 | 0.900 | 5.0% |
| C | 45.0% | Standridge | SCC-13922 | CaCO$_3$ Compound | 6.5 | 1.800 | 75.0% |
|  |  | Dow | PL1280 | mPE | 6.0 | 0.900 | 19.0% |
|  |  | Standridge | 27933 | Blue | 6.0 | 0.900 | 6.0% |
| B | 8.0% | Dupont | Hytrel 8206 | Polyester Elastomer | 12.00 | 1.190 | 100.0% |

TABLE 2

Specification: XP9538H (Comparative Example 2)

| Layer | Layer Percent | Resin Supplier | Resin Number | Type | Melt Index | Resin Density | Percent Within |
|---|---|---|---|---|---|---|---|
| A | 50.0% | Standridge | SCC-13922 | CaCO$_3$ Compound | 6.5 | 1.800 | 75.0% |
|   |       | Dow        | 5230G     | LLDPE | 4.0 | 0.916 | 18.0% |
|   |       | Ampacet    | 10562     | Process aid | 2.0 | 0.918 | 2.0% |
|   |       | Standridge | 27933     | blue | 6.0 | 0.900 | 5.0% |
| C | 45.0% | Standridge | SCC-13922 | CaCO$_3$ Compound | 6.5 | 1.800 | 75.0% |
|   |       | Dow        | PL1280    | mPE | 6.0 | 0.900 | 20.0% |
|   |       | Dupont     | 1224AC    | EMA | 2.00 | 0.940 | 5.0% |
| B | 5.0%  | Dupont     | Hytrel 8206 | LLDPE | 12.00 | 1.190 | 100.0% |

TABLE 3

Specification: XP9538S - 250 A1 (Example 3)

| Layer | Layer Percent | Resin Supplier | Resin Number | Type | Melt Index | Resin Density | Percent Within |
|---|---|---|---|---|---|---|---|
| A | 52.0% | Standridge | SCC-13922 | CaCO$_3$ Compound | 6.5 | 1.800 | 75.0% |
|   |       | Dow        | 5230G     | LLDPE | 4.0 | 0.916 | 23.0% |
|   |       | Ampacet    | 10562     | Process aid | 2.0 | 0.918 | 2.0% |
| C | 42.0% | Standridge | SCC-13922 | CaCO$_3$ Compound | 6.5 | 1.800 | 75.0% |
|   |       | Dow        | 5230G     | LLDPE | 4.0 | 0.916 | 9.0% |
|   |       | Standridge | 27933     | blue | 6.0 | 0.900 | 6.0% |
|   |       | Dupont     | 1224AC    | 24% EMA | 2.00 | 0.940 | 10.0% |
| B | 6.0%  | Dupont     | Hytrel 8206 | PET | 12.00 | 1.190 | 75.0% |
|   |       | Dupont     | 1224AC    | 24% EMA | 2.0 | 0.940 | 25.0% |

TABLE 4

Specification: XP9538S - 01 dis (Example 4)

| Layer | Layer Percent | Resin Supplier | Resin Number | Type | Melt Index | Resin Density | Percent Within |
|---|---|---|---|---|---|---|---|
| A | 52.0% | Standridge | SCC-13922 | CaCO$_3$ Compound | 6.5 | 1.800 | 75.0% |
|   |       | Dow        | 5230G     | LLDPE | 4.0 | 0.916 | 23.0% |
|   |       | Ampacet    | 10562     | Process aid | 2.0 | 0.918 | 2.0% |
| C | 42.0% | Standridge | SCC-13922 | CaCO$_3$ Compound | 6.5 | 1.800 | 75.0% |
|   |       | Standridge | 27933     | blue in PL1280 | 6.0 | 0.900 | 6.0% |
|   |       | Dupont     | 1218AC    | 18% EMA | 2.00 | 0.940 | 19.0% |
| B | 6.0%  | Dupont     | Hytrel 8206 | PET | 12.00 | 1.190 | 80.0% |
|   |       | Dupont     | 1218AC    | 18% EMA | 2.00 | 0.940 | 20.0% |

TABLE 5

Specification: XP9538S - 02 dis (Example 5)

| Layer | Layer Percent | Resin Supplier | Resin Number | Type | Melt Index | Resin Density | Percent Within |
|---|---|---|---|---|---|---|---|
| A | 52.0% | Standridge | SCC-13922 | CaCO$_3$ Compound | 6.5 | 1.800 | 75.0% |
|   |       | Dow        | 5230G     | LLDPE | 4.0 | 0.916 | 23.0% |
|   |       | Ampacet    | 10562     | Process aid | 2.0 | 0.918 | 2.0% |
| C | 42.0% | Standridge | SCC-13922 | CaCO$_3$ Compound | 6.5 | 1.800 | 75.0% |
|   |       | Standridge | 27933     | Blue | 6.0 | 0.900 | 6.0% |
|   |       | Dupont     | 1913AC    | 13% EMA | 9.00 | 0.930 | 19.0% |
| B | 6.0%  | Dupont     | Hytrel 8206 | PET | 12.00 | 1.190 | 80.0% |
|   |       | Dupont     | 1913AC    | 13% EMA | 9.00 | 0.930 | 20.0% |

TABLE 6

Specification: XP9538S - 252 S1 (Example 6)

| Layer | Layer Percent | Resin Supplier | Resin Number | Type | Melt Index | Resin Density | Percent Within |
|---|---|---|---|---|---|---|---|
| A | 52.0% | Standridge | SCC-13922 | CaCO₃ Compound | 6.5 | 1.800 | 75.0% |
|   |   | Dow | PL1280 | mPE | 6.0 | 0.900 | 23.0% |
|   |   | Ampacet | 10562 | Process aid | 2.0 | 0.918 | 2.0% |
| C | 45.0% | Standridge | SCC-13922 | CaCO₃ Compound | 6.5 | 1.800 | 75.0% |
|   |   | Dow | PL1280 | mPE | 6.0 | 0.900 | 9.0% |
|   |   | Standridge | 27933 | blue in PL1280 | 6.0 | 0.900 | 6.0% |
|   |   | Dupont | AC1218 | acrylate | 6.00 | 0.930 | 10.0% |
| B | 3.0% | Dupont | Hytrel 4778 | PET | 12.00 | 1.190 | 90.0% |
|   |   | Dupont | AC1218 | acrylate | 8.0 | 0.940 | 10.0% |

TABLE 7

Specification: XP9538S - 253 dis (Example 7)

| Layer | Layer Percent | Resin Supplier | Resin Number | Type | Melt Index | Resin Density | Percent Within |
|---|---|---|---|---|---|---|---|
| A | 52.0% | Standridge | SCC-13922 | CaCO₃ Compound | 6.5 | 1.800 | 75.0% |
|   |   | Dow | 5630 | LLDPE | 4.5 | 0.916 | 23.0% |
|   |   | Ampacet | 10562 | Process aid | 2.0 | 0.918 | 2.0% |
| C | 42.0% | Standridge | SCC-13922 | CaCO₃ Compound | 6.5 | 1.800 | 70.0% |
|   |   | Dow | 5630 | LLDPE | 4.5 | 0.916 | 9.0% |
|   |   | Standridge | 27933 | blue in PL1280 | 6.0 | 0.900 | 6.0% |
|   |   | Dupont | 3101 | EVA | 3.20 | 0.943 | 15.0% |
| B | 6.0% | Dupont | Hytrel 8206 | PET | 12.00 | 1.190 | 80.0% |
|   |   | Dupont | 3101 | EVA | 3.20 | 0.943 | 20.0% |

TABLE 8

| XP |   | Temperature F. | XP9538S-250 | | XP9538S-250 | | XP9538S-252 | |
|---|---|---|---|---|---|---|---|---|
| Line Speed |   |   | 226 |   | 220 |   | 220 |   |
| Extruder % target |   |   | 125 |   | 125 |   | 125 |   |
| EXT A RPM/Layer % |   |   | 47 | 52 | 47 | 52 | 47 | 52 |
| EXT B RPM/Layer % |   |   | 73 | 6 | 73 | 6 | 73 | 6 |
| EXT C RPM/Layer % |   |   | 50 | 42 | 48 | 42 | 48 | 42 |
| Total lbs |   |   | 2250 |   | 2250 |   | 2250 |   |
| Calculated thickness |   |   | 3.23 |   | 3.32 |   | 3.32 |   |
| Primary chill roll | speed (rpm) | 75 | 226 |   | 220 |   | 220 |   |
| Preheat roll #1 | stretch/speed (rpm) | 198 | 1.05 | 237 | 1.02 | 225 | 1.02 | 225 |
| Preheat roll #2 | stretch/speed (rpm) | 198 | 1.03 | 244 | 1.03 | 231 | 1.03 | 231 |
| Draw roll #3 | stretch/speed (rpm) | 175 | 2.73 | 667 | 2.78 | 642 | 2.78 | 642 |
| Draw roll #4 | stretch/speed (rpm) | 175 | 1.69 | 1128 | 1.73 | 1111 | 1.73 | 1111 |
| Annealing roll #5 | stretch/speed (rpm) | 175 | 0.98 | 1106 | 0.98 | 1090 | 0.98 | 1090 |
| Annealing roll #6 | stretch/speed (rpm) | 175 | 0.94 | 1040 | 0.95 | 1035 | 0.95 | 1035 |
| Annealing roll #7 | stretch/speed (rpm) | 170 | 0.93 | 967 | 0.93 | 962 | 0.93 | 962 |
| Embossing roll #8 | stretch/speed (rpm) | 150 | 0.98 | 948 | 0.99 | 952 | 0.99 | 952 |
| Treater roll | stretch/speed (rpm) | 132 | 1.04 | 986 | 1 | 953 | 1 | 953 |
| winder pull roll | stretch/speed (rpm) |   | 0.45 | 990 | 0.45 | 956 | 0.45 | 956 |
| Spreader roll #1 | stretch | 62 | 0.53 |   | 0.53 |   | 0.53 |   |
| Spreader roll #2 | stretch |   | 0.65 | 997 | 0.65 | 963 | 0.65 | 963 |
| Stretch Ratio |   |   | 4.412 |   | 4.377 |   | 4.377 |   |
| GSM |   |   | 25 |   | 25 |   | 25 |   |
| WVTR |   |   | 4000 |   | 5700 |   | 4200 |   |

TABLE 9

| Tag: | SampleName: | SampleDescription: | Avg | Stdev |
|---|---|---|---|---|
| | | Log # 20494 WVTR Convergence | | |
| A | XP9538H | XP9538H, 27 gsm, 4x, | 11449 | 569 |
| D | XP9538G | XP9538G, 27 gsm, 3x | 6940 | 478 |
| E | XP9538G | XP9538G, 27 gsm, 4x | 5483 | 218 |
| | | Log 20496 WVTR Convergence | | |
| A | XP9538G | XP9538G, 5x, 27 gsm | 3862 | 205 |
| C | XP9538H | XP9538H, 3x, 27 gsm | 5425 | 325 |
| | | Log 20500 WVTR Convergence | | |
| K | XP9538S | XP9538S, 4x, 27 gsm | 4992 | 236 |
| L | XP9538S | XP9538S, 5x, 27 gsm | 5325 | 456 |

What is claimed is:

1. A multilayer breathable barrier film comprising:
    at least one internal barrier layer that is moisture permeable, said at least one internal barrier layer comprising a hygroscopic polymer,
    at least two microporous layers each comprising a) a polyolefin and b) an adhesive, wherein said at least two microporous layers are the same or different, and said at least one internal barrier layer is disposed between said at least two microporous layers,
    wherein the internal barrier layer further comprises an adhesive.

2. The breathable film of claim 1, wherein the same or different adhesive is provided in each of the internal barrier layer and the microporous layers.

3. The breathable film of claim 1, wherein the hygroscopic polymer is selected from the group consisting of hygroscopic elastomers, polyesters, polyamides, polyetherester copolymers, polyetheramide copolymers, polyurethanes, polyurethane copolymers, poly(etherimide) ester copolymers, polyvinyl alcohols, ionomers, celluloses, nitrocelluloses, derivatives thereof and combinations thereof.

4. The breathable film of claim 1, wherein the adhesive comprises polyethylene/acrylate copolymer, ethylene/methyl acrylate copolymer, acid-modified acrylate, anhydride-modified acrylate, ethylene vinyl acetate, acid/acrylate-modified ethylene vinyl acetate, anhydride-modified ethylene vinyl acetate and combinations thereof.

5. The breathable film of claim 1, wherein the microporous layers contain at least one filler selected from the group consisting of calcium carbonate, barium sulfate, talc, silica, clay, glass spheres, inorganic particulates, organic fillers, organic domains, nanoparticulates, fibers, derivatives thereof, and combinations thereof, wherein the same or different filler is provided in each of the microporous layers.

6. The breathable film of claim 5, wherein the at least one filler has a mean particle size from about 0.1 micron to about 15 microns.

7. The breathable film of claim 1, wherein the polyolefin is polyethylene or polypropylene.

8. The breathable film of claim 1, wherein the polyolefin is selected from the group consisting of low density polyethylene, high density polyethylene, linear low density polyethylene, ultra low density polyethylene, and polypropylene.

9. The breathable film of claim 1, wherein the film has an A-C-B-C-A structure, wherein A and C are the microporous layers and B is the internal barrier layer.

10. The breathable film of claim 1, wherein the film has a breathability from about 1500 grams/m$^2$/day to about 20,000 grams/m$^2$/day.

11. The breathable film of claim 1, wherein the internal barrier layer has a thickness less than 12 microns.

12. The breathable film of claim 1, wherein the internal barrier layer has a thickness less than 5 microns.

13. The breathable film of claim 1, wherein the internal barrier layer has a thickness less than 2 microns.

14. The breathable film of claim 1, wherein the film has a basis weight of from about 10 grams/m$^2$ to about 125 grams/m$^2$.

15. The breathable film of claim 1, wherein the film passes the ASTM F-1670 test or the ASTM F-1671 test or both.

16. The breathable film of claim 1, wherein the film has a percent stretch of from about 200% to about 600%.

17. A multilayer breathable viral and alcohol barrier film comprising:
    at least one internal viral and alcohol barrier layer that is moisture permeable, said internal layer comprising a hygroscopic polymer that is unfilled;
    at least two microporous layers each comprising a) a polyolefin, b) an adhesive, and c) an additive, wherein said at least two microporous layers are the same or different, and said at least one internal barrier layer is disposed between said at least two microporous layers;
    wherein the multilayer breathable viral and alcohol barrier film has an alcohol penetration of less than 10% as measured by Pressure Penetration Through a Fabric (PPT) testing.

* * * * *